United States Patent
Mennicke et al.

(10) Patent No.: US 6,194,554 B1
(45) Date of Patent: Feb. 27, 2001

(54) DISAZO DYES

(75) Inventors: Winfried Mennicke, Leverkusen; Klaus Kunde, Neunkirchen-Seelscheid, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/195,388

(22) Filed: Nov. 18, 1998

(30) Foreign Application Priority Data

Dec. 1, 1997 (DE) .............................. 197 53 223

(51) Int. Cl.$^7$ .............................. C09B 35/037; D06P 3/32; D06P 3/60; C09D 11/02

(52) U.S. Cl. .............................. 534/819; 534/828; 8/527; 8/687; 8/918; 8/919; 106/31.52

(58) Field of Search ...................... 534/828, 819; 8/527, 687, 918, 919; 106/31.52

(56) References Cited

U.S. PATENT DOCUMENTS

| 877,643 | * | 1/1908 | Gunther et al. | 534/828 |
|---|---|---|---|---|
| 877,644 | * | 1/1908 | Gunther et al. | 534/828 |
| 897,529 | * | 9/1908 | Gunther et al. | 534/828 |
| 1,020,756 | * | 3/1912 | Gast et al. | 534/828 |
| 1,079,415 | * | 11/1913 | Kalischer | 534/828 |
| 5,225,545 | | 7/1993 | Lauk | 534/829 |
| 5,288,294 | | 2/1994 | Käser | 8/687 |
| 5,487,761 | | 1/1996 | Käser | 8/527 |
| 5,512,663 | | 4/1996 | Kunde | 534/633 |
| 5,559,217 | | 9/1996 | Käser | 534/828 |
| 5,795,971 | | 8/1998 | Kunde | 534/637 |

FOREIGN PATENT DOCUMENTS

| 148003 | | 9/1931 | (CH) . |
|---|---|---|---|
| 148005 | | 9/1931 | (CH) . |
| 293554 | | 9/1915 | (DE) . |
| 0 597 672 | | 5/1994 | (EP) . |
| 380540 | | 12/1907 | (FR) . |
| 392589 | | 11/1908 | (FR) . |
| 402126 | | 9/1909 | (FR) . |
| 456232 | | 8/1913 | (FR) . |
| 689111 | | 9/1930 | (FR) . |
| 870239 | | 3/1942 | (FR) . |
| 53803 | | 9/1946 | (FR) . |
| 934352 | | 5/1948 | (FR) . |
| 60-243176 | * | 12/1985 | (JP) . |
| 1-172907 | * | 7/1989 | (JP) . |
| 98/44051 | | 10/1998 | (WO) . |

OTHER PUBLICATIONS

Colour Index, 3rd Edition, 1971, vol. 4, pp. 4253–4255, C.I. Nos. 27865, 27920, 27925, 27950.*

Dialog database, Abstract of Japanese Patent 01–172,907, Jul. 7, 1989.

* cited by examiner

Primary Examiner—Fiona T. Powers
(74) Attorney, Agent, or Firm—Joseph C. Gil; Richard E. L. Henderson

(57) ABSTRACT

The invention relates to novel disazo dyes of the formula

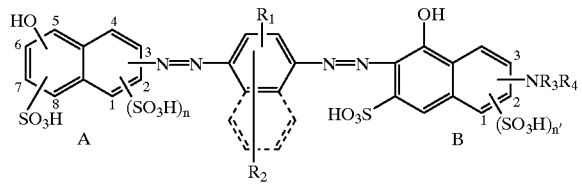

in which the substituents and indices have the meaning stated in the disclosure, that are suitable for dyeing and printing polymeric materials and for the preparation of recording liquids for ink jet recording apparatus.

11 Claims, No Drawings

DISAZO DYES

BACKGROUND OF THE INVENTION

The present invention relates to new disazo dyes, a process for their preparation, their use for dyeing and printing polymeric materials, in particular cellulosic materials and leather, and liquid preparations containing these dyes and their use as recording liquids for ink jet recording apparatuses.

The new disazo dyes correspond to the formula (1)

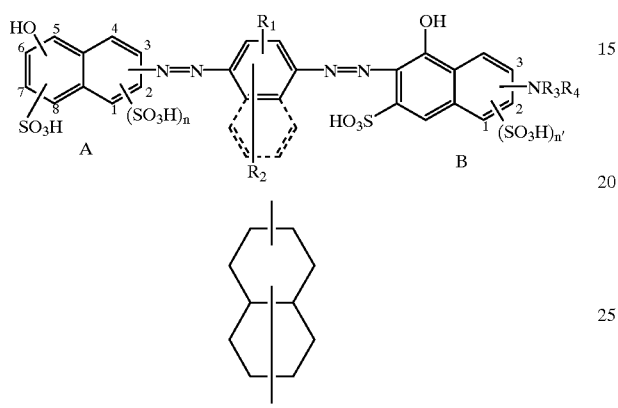

wherein $R_1$ represents hydrogen, $C_1$–$C_4$-alkyl, $C_1$–$C_4$-alkoxy, $C_1$–$C_4$-alkyl-carbonylamino, ureido, or amino;

$R_2$ represents hydrogen, $C_1$–$C_4$-alkyl, $C_1$–$C_4$-alkoxy, sulfo, or carboxyl;

$R_3$ represents hydrogen; unsubstituted $C_1$–$C_4$-alkyl or $C_1$–$C_4$-alkyl substituted by $NH_2$, di($C_1$–$C_4$-alkyl) amino, OH, or $C_1$–$C_4$-alkoxy; unsubstituted aryl or aryl substituted one to four times in an identical or different manner by $C_1$–$C_4$-alkyl, $C_1$–$C_4$-alkoxy, $NH_2$, OH, sulfo, or carboxyl; ureido; formyl; $C_1$–$C_4$-alkylcarbonyl; or unsubstituted benzoyl or benzoyl substituted one to four times in an identical or different manner by $C_1$–$C_4$-alkyl, $C_1$–$C_4$-alkoxy, sulfo, or carboxyl;

$R_4$ represents hydrogen, unsubstituted $C_1$–$C_4$-alkyl, or $C_1$–$C_4$-alkyl substituted by hydroxyl or $C_1$–$C_4$-alkoxy;

the dotted lines represent an optional fused-on benzene ring; and n and n' independently of one another represent the number 0 or 1 with the provisos that (i) in naphthyl ring A of formula (1) the OH group is in the 5-, 6-, or 8-position, the $SO_3H$ group is in the 6-, 7-, or 8-position, the $(SO_3H)_n$ group is in the 1-, 3-, or 4-position, and the azo group is in the 1- or 2-position, (ii) in naphthyl ring B of formula (1) the $NR_3R_4$ group is in the 2- or 3-position and the $(SO_3H)_n$ group is in the 1- or 2-position, and (iii) the disazo dyes exclude the dye of the formula (2)

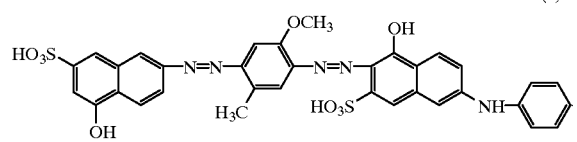

Disazo dye (2) is described in Japanese patent specification jp 1,172,907 and is claimed for use in polarizing sheets:

The dyes of the formula (1) according to the invention can each be present both as the free acid or partly or completely in the form of their salts. The dyes are generally employed as salts, particularly as lithium, sodium, potassium, ammonium, mono-, di- or tris($C_1$–$C_4$-alkyl)ammonium, mono, di or tris($C_1$–$C_4$-alkanol)ammonium, or mixed ($C_1$–$C_4$-alkyl) ($C_1$–$C_4$-alkanol)ammonium salts.

The expression di($C_1$–$C_4$-alkyl)amino in the definition of $R_3$ denotes $C_1$–$C_4$-alkylamino and $C_1$–$C_4$-dialkylamino.

Preferred dyes of the formula (1) according to the invention are those which correspond to the formula (3)

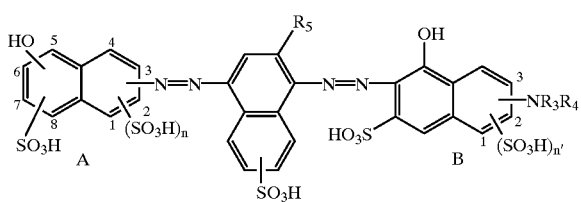

wherein $R_3$, $R_4$, n, and n' have the meanings stated above for formula (1) and the substituents are bonded to the naphthyl rings in the same positions as stated above for formula (1), and $R_5$ represents hydrogen, $C_1$–$C_4$-alkyl, or $C_1$–$C_4$-alkoxy.

Dyes that are particularly preferred because of their usually deep black desired shade have the formula (4)

(4)

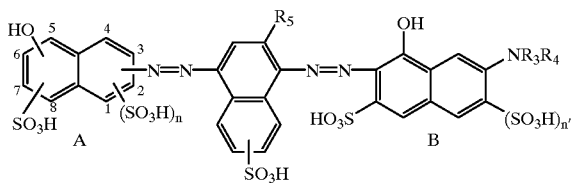

wherein
$R_3$, $R_4$, n and n' have the meanings stated above for formula (1) and the bonding of the substituents in naphthyl ring A is in the same positions as stated for these substituents under formula (1), and
$R_5$ represents hydrogen, $C_1$–$C_4$-alkyl, or $C_1$–$C_4$-alkoxy.

The dyes (1) according to the invention can be obtained by a process in which aminonaphtholsulfonic acids of the formula (5)

(5)

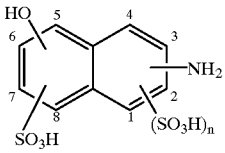

(wherein the OH group is in position 5, 6, or 8, the $SO_3H$ group is in position 6, 7, or 8, the $(SO_3H)_n$ group is in position 1, 3, or 4, the amino group is in position 1 or 2, and n denotes the number 0 or 1) are diazotized and the resultant diazotization products are coupled to an aminobenzene or aminonaphthalene of the formula (6)

(6)

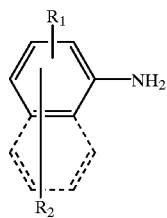

(wherein $R_1$ and $R_2$ and the dotted lines have the meanings stated above for formula (1)) and the aminoazo dyes formed in this reaction having the formula (7)

(7)

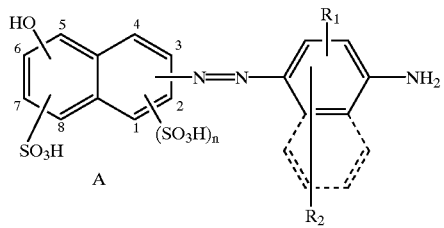

(wherein $R_1$, $R_2$, and n and the dotted lines have the meanings stated above under formula (1) and the bonding of the substituents in naphthyl ring A is as stated above for these substituents under formula (5)) are again diazotized and the resultant second diazotization products are coupled to aminonaphtholsulfonic acids of the formula (8)

(8)

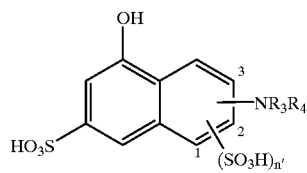

(wherein $R_3$, $R_4$ and n' have the meanings stated under (1), the $NR_3R_4$ group is in the 2- or 3-position, and the $(SO_3H)_{n'}$ group is in 1- or 2-position).

Examples of suitable aminonaphtholsulfonic acids of the formula (5) include:
2-amino-5-naphthol-7-sulfonic acid,
2-amino-5-naphthol-1,7-disulfonic acid,
2-amino-8-naphthol-6-sulfonic acid,
2-amino-8-naphthol-3,6-disulfonic acid,
2-amino-6-naphthol-8-sulfonic acid,
1-amino-5-naphthol-6-sulfonic acid,
1-amino-5-naphthol-7-sulfonic acid,
1-amino-6-naphthol-3,8-disulfonic acid, and
1-amino-8-naphthol-4-sulfonic acid.

Suitable aminobenzenes and aminonaphthalenes of the formula (6) include:
1-amino-2- or -3-methoxybenzene,
1-amino-2- or -3-methylbenzene,
1-amino-3-ureidobenzene,
1-amino-3-acetylaminobenzene,
1-amino-2-methoxy-5-methylbenzene,
1-amino-2,5-dimethylbenzene,
1-amino-2,5-dimethoxybenzene,
1-amino-2-methyl-5-acetylaminobenzene,
1-amino-2- methoxy-5-acetylaminobenzene,
1-amino-2-methyl-5-ureidobenzene,
1-amino-2- methoxy-5-ureidobenzene,
1-amino-5-acetylamino-2-sulfonic acid,
1-aminonaphthalene-6- or -7-sulfonic acid,
1-aminonaphthalene-6- or -7-carbonic acid,
1-aminonaphthalene-2-methyl-6- or -7-sulfonic acid, and
1-aminonaphthalene-2-methoxy-6- or -7-sulfonic acid.

The following coupling components are examples of amino-naphtholsulfonic acids of the formula (8): 2-amino-, 2-methylamino-, 2-dimethylamino-, 2-(2-aminoethylamino)-, 2-(3-diethylaminopropyl-amino)-, 2-phenylamino-, 2-(4-sulfophenylamino)-, 2-(3-sulfophenyl-amino)-, 2-(4-carboxyphenylamino)-, 2-(3-carboxyphenylamino)-, 2-(4-methylphenylamino)-, 2-(2,4-dimethylphenylamino)-, 2-(4-methoxyphenyl-amino)-, 2-(4-aminophenylamino)-, 2-(4-amino-3-sulfophenylamino)-, 2-(4-benzoylamino-3- sulfophenylamino)-, 2-ureido, 2-acetamino-, 2-(N-ethyl-acetamino)-, 2-propionylamino-, 2-benzoylamino-, 2-(4-methylbenzoyl-amino)-5-hydroxynaphthalene-7-sulfonic acid; 2-amino-, 2-acetamino-, and 2-benzoylamino-5-hydroxynaphthalene-1,7-disulfonic acid; 2-amino-, 2-methylamino-, 2-dimethylamino-, 2-ethylamino-, 2-(2-hydroxyethyl-amino)-, 2-(bis-2-hydroxyethylamino)-2-(2-aminoethylamino)-, 2-(3-diethylaminopropylamino)-, 2-phenylamino-, 2-(4-sulfophenylamino)-, 2-(3-sulfophenylamino)-, 2-(4-carboxyphenylamino)-, 2-(3-carboxyphenyl-amino)-, 2-(2,4-dimethylphenylamino)-, 2-(4-methoxyphenylamino)-, 2-(4-aminophenylamino)-, 2-(4-amino-3-sulfophenylamino)-, 2-(4-benzoyl-amino-3-sulfophenylamino)-, 2-ureido, 2-acetamino-, 2-propionylamino-, 2-benzoylamino-, and 2-(4-methylbenzoylamino)-8-hydroxynaphthalene-6-sulfonic acid; and 2-amino-8-hydroxynaphthalene-6-sulfonic acid.

The diazotization of the aminonaphtolsulfonic acids of the formula (5) and of the aminoazo dyes of the formula (7) formed as intermediates is carried out in a known manner known, for example, with an alkali metal nitrite (such as sodium nitrite) in a mineral acid medium (preferably a hydrochloric acid medium) at temperatures of 0° C. to 30° C. (preferably 0° C. to 15° C.). The coupling of the diazotized aminonaphtolsulfonic acids of the formula (5) with an aminobenzene or aminonaphthalene of the formula (6) and the coupling of the diazotized aminoazo dyes of the formula (7) with an aminonaphtolsulfonic acid of the formula (8) are likewise carried out under customary known conditions. The coupling reaction is preferably carried out in an aqueous medium at a weakly acid, neutral, or alkaline pH and at temperatures of 0° C. to 30° C. (preferably 10° C. to 25° C.). A neutral to weakly acid pH (preferably in the range from 7 to 4) is advantageous for the coupling reaction with the aminobenzenes or aminonaphthalenes of the formula (6) and a neutral to weakly alkaline pH (preferably in the range from 7.5 to 9) is advantageous for the coupling reaction with the amino-naphtolsulfonic acids of the formula (8). The desired pH can be established and maintained by addition of bases, such as alkali metal hydroxides, carbonates, or acetates (for example, lithium, sodium, or potassium hydroxide, carbonate, or acetate), ammonia, or organic amines (for example, diethanolamine, triethanolamine, methyldiethanolamine, ethyidiethanolamine, dimethylethanolamine, or diethylethanolamine), or polyglycolamines (for example, the reaction product of ammonia with 6 mol of ethylene oxide).

The dyes according to the invention prepared in this way can be isolated by salting out with alkali metal salts, spray drying, or evaporation on a roll and then processed to water-soluble preparations with the customary standardizing agents and auxiliaries. The dyes can also be worked up to aqueous concentrated and stable solutions, with and without prior isolation, by subjecting their aqueous solutions or suspensions to a membrane separation process (particularly ultrafiltration), thereby largely freeing them from electrolytes and low molecular weight by-products. The liquid dye preparations are preferably free from organic solubilizing agents and generally contain 10 to 40% by weight (preferably 20 to 30% by weight) of at least one dye of the formula (1) according to the invention.

The invention also relates to the use of the disazo dyes of the formula (1) for dyeing and printing polymeric materials, particularly materials that contain carboxamide groups and/or are cellulosic, such as leather, cotton, regenerated cellulose fibers, and paper.

With respect to their properties, the dyes of formula (1) can be regarded as substantive or direct dyes and can therefore be used by all processes customary for substantive dyes in the leather, textile, and paper industry.

The dyes (1) are particularly suitable for the preparation of papers dyed in the pulp and on the surface. Thus, sized and non-sized grades of paper that can originate from bleached and non-bleached cellulose of various origins, such as softwood or hardwood sulfite or sulfate cellulose, are possible. For dyeing paper in the pulp, the dyes (1) are added to the paper pulp before the sheet formation. This addition can take place either in the thick matter after beating of the cellulose or in the thin matter before delivery to the paper-making machine. For dyeing paper sized in the pulp, the dyes (1) are preferably added to the thin matter before the sizing agent and for dyeing paper on the surface they are preferably dissolved in a concentrated starch solution and applied to the paper in this form using a sizing press. The dyes (1) can also be employed for dip dyeing of paper.

The dyes of the formula (1) according to the invention give dark violet to black dyeings with good wet- and light-fastnesses on the above-mentioned materials. In dyeing on paper, the dyes are distinguished by a high absorption. The paper dyeings obtained here in a high coloristic yield have good bleaching properties, are insensitive to alum and largely insensitive to pH, and are resistant not only to water but also to milk, fruit juices, and alcoholic drinks.

The dyes of the formula (1) according to the invention are also suitable for the preparation of recording liquids for ink jet printing processes, for example, in combination with bubble jet or piezo printing systems.

To prepare the printing inks, which are also according to the invention, one or more dyes of the formula (1) in a low-salt form that is as pure as possible are dissolved in water, if appropriate with the addition of one or more water-soluble organic solvents, hydrotropic auxiliaries and further customary additives. An aqueous dye solution that has been previously purified and concentrated by membrane separation processes, such as, for example, microfiltration, ultrafiltration, nanofiltration, reverse osmosis, or combinations thereof, is preferably used for the preparation of printing inks according to the invention. The preferred method is ultra-filtration on membranes that are permeable to salts and compounds having a molecular weight of less than about 20,000 dalton.

Organic solvents and agents having a hydrotropic action that are suitable for the printing inks according to the invention include mono- and polyhydric alcohols and ethers and esters thereof, nitriles, carboxylic acid amides, cyclic amides, ureas, esters, sulfones, and sulfoxides. Particularly suitable solvents include methanol, ethanol, propanol, ethylene glycol and the monomethyl, -ethyl and -propylether thereof, 1,2-propylene glycol, 1-methoxy- and 1-ethoxy-2-propanol, diethylene glycol, diethylene glycol monomethyl and monoethyl ether, dipropylene glycol, triethylene glycol, 1,5-pentanediol, glycerol, 2-hydroxyethyl and 2-(2-hydroxyethoxy)ethyl acetate, 2-hydroxypropionitrile, formamide, dimethylformamide, pyrrolidone, N-methylpyrrolidone, 6-caprolactam, N-methyl-6-caprolactam, urea, tetramethylurea, 1,3-dimethyl-2-imidazolidinone, N,N'-dimethyl-propyleneurea, butyrolactone, dimethylsulfoxide, dimethyl sulfone, sulfolane, and polyethylene glycols having a molecular weight of up to 500 dalton.

Suitable additives that are customarily used in printing inks include both ionic and nonionic substances with which viscosity and/or surface tension can be established in the ranges required for use, as well as fungicides, bactericides, and binders (such as, for example, acrylate binders).

In addition to containing one or more dyes of the formula (1), the printing inks can also additionally contain other dyes known from the Colour Index that can be used for shading.

The printing inks according to the invention contain (1) 0.5 to 20% by weight of at least one dye of the formula (1), (2) 0 to 5% by weight (preferably 0.1 to 5% by weight) of at least one dye used for shading, (3) 50 to 99.5% by weight of water, (4) 0 to 30% by weight of one or more water-soluble organic solvents and/or agents having a hydrotropic action, and (5) 0 to 30% by weight of customary additives, such as agents which influence viscosity and/or surface tension, fungicides, bactericides and binders.

Paper is the preferred recording material for ink jet printing systems.

The following examples further illustrate details for the preparation and use of the compounds of this invention. The invention, which is set forth in the foregoing disclosure, is not to be limited either in spirit or scope by these examples. Those skilled in the art will readily understand that known variations of the conditions and processes of the following preparative procedures can be used to prepare these compounds. Unless otherwise noted, all temperatures are degrees Celsius and all percentages are percentages by weight.

EXAMPLES

Example 1

To 26.6 g of 90.0% pure 2-amino-5-naphthol-7-sulfonic acid dissolved in 200 ml of water by addition of 4.2 g of LiOH-H$_2$O were added 23 ml of 4.35 N sodium nitrite solution. The mixture was discharged into a mixture of 100 ml of water, 35 ml of 10 N hydrochloric acid, and 100 g of ice over the course of 20 minutes. The suspension formed by this operation was subsequently stirred at temperatures of up to not more than 20° C. for one and a half hours. A solution of 27.1 g of 82.4% pure 1-amino-naphthalene-6-sulfonic acid dissolved in 200 ml of water with about 10 ml of 10 N sodium hydroxide solution was introduced into the diazotization suspension over the course of 20 minutes. The mixture was brought to pH 3.0 by dropwise addition of a total of 80 ml of 2.44 N sodium acetate solution, kept at this pH for 5 hours, and then brought to pH 3.5 and subsequently stirred for two hours. When the coupling had ended, the pH was brought to 7.5 by dropwise addition of 10 N sodium hydroxide solution. The monoazo dye of the formula

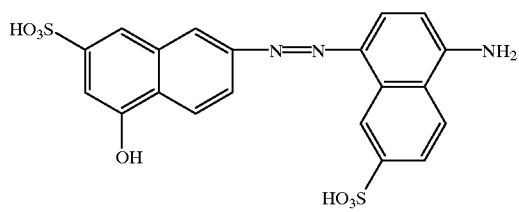

was precipitated by addition of 160 g of sodium chloride and subsequent stirring for three hours and filtered off with suction.

For further processing, the paste of the monoazo dye was dissolved in 250 ml of water, after which 23 ml of 4.35 N sodium nitrite solution were added. The mixture was added dropwise to a reservoir of 150 ml of water, 200 g of ice, and 35 ml of 10 N hydrochloric acid over the course of 30 minutes. The mixture was subsequently stirred at 10 to 15° C. for 2.5 hours, until the diazotization has ended, after which excess nitrous acid removed with aminosulfonic acid. To 27.19 g of 88% pure 2-amino-8-naphthol-6-sulfonic acid dissolved in 200 ml of water by addition of 55 g of solid sodium carbonate was added 250 g of ice. The diazotization suspension was introduced over a period of 45 minutes and the mixture was subsequently stirred for 4 hours without addition of ice, after which was added 10% by volume of sodium chloride. The resultant solid was collected by suction filtration. For purification, the resultant bisazo dye, which, in the form of the free acid, corresponds to the formula

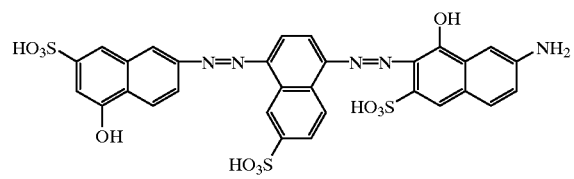

($\lambda_{max}$ 571 nm), was dissolved in 1.5 litres of hot water at 60° C., precipitated with 7.5% by volume of sodium chloride, and again collected by suction filtration. After drying, the dye was obtained as a black powder that is absorbed virtually completely on paper and cotton and gives light- and wet-fast black dyeings as a result.

Example 2

When 25.8 g of 86.4% pure 1-aminonaphthalene-7-sulfonic acid were used instead of the 27.1 g of 82.4% pure 1-aminonaphthalene-6-sulfonic acid of Example 1 and 56.2 g of 60.7% pure 2-amino-8-naphthol-3,6-disulfonic acid were used instead of the 27.19 g of 88% pure 2-amino-8-naphthol-6-sulfonic acid of Example 1, the procedure otherwise being as described in this example, the dye of the formula

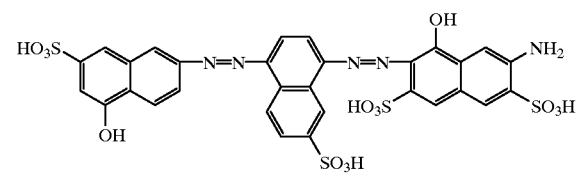

which dyes paper and cotton and leather in deep black shades, was obtained.

Example 3

Under the same conditions, using appropriate starting compounds, the black disazo dye of the formula

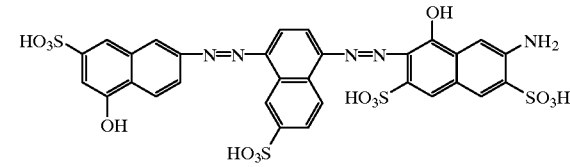

was obtained.

The paste obtained after reprecipitation of the dye was dissolved in about 1000 ml of water. The solution was subjected to an ultrafiltration in a laboratory unit until the content of chloride ions had decreased to about one eighth of the original value. The dialyzed solution was then filtered through a 2.0 μm filter and concentrated to dryness. A 3.0 g portion of the dry residue was dissolved in 100 g of a mixture of 84 g of water, 8 g of 1,5-pentanediol, and 8 g of 2-pyrrolidone. A black ink with which contour-sharp fast prints could be produced on paper by ink jet printing by the bubble jet or piezo system was obtained.

Examples 4 to 61

The disazo dyes shown in Table 1, which give black dyeings, were obtained in an analogous manner to Example 1.

TABLE 1

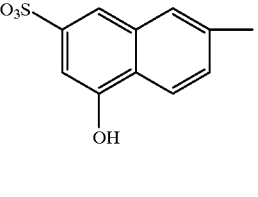

| Example No. | A- | -B- | C |
|---|---|---|---|
| 4 | 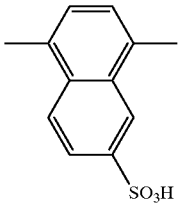 |  | $NH_2$ |
| 5 | 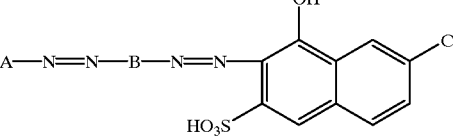 | 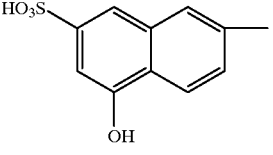 | $NHCOCH_3$ |
| 6 | 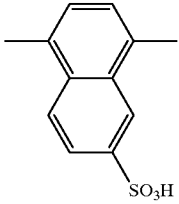 |  | $NH-CO-NH_2$ |
| 7 | 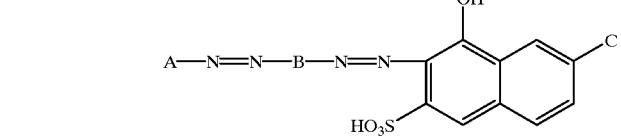 | 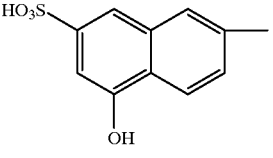 | 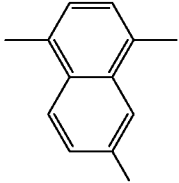 |
| 8 | 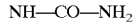 | 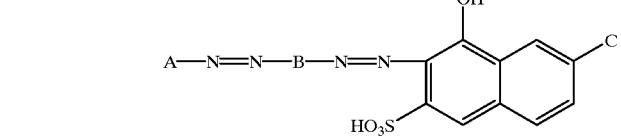 | 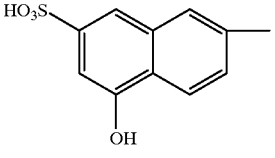 |

TABLE 1-continued $$A-N{=}N-B-N{=}N-\text{(naphthalene with OH, }SO_3H\text{, C substituents)}$$

| Example No. | A- | -B- | C |
|---|---|---|---|
| 9 | 3-HO₃S, 5-OH naphthalen-7-yl | naphthalene-1,4-diyl-6-SO₃H | NHCH₂CH₂NH₂ |
| 10 | 3-HO₃S, 5-OH naphthalen-7-yl | naphthalene-1,4-diyl-6-SO₃H | NHCH₂CH₂CH₂N(CH₃)₂ |
| 11 | 3-HO₃S, 5-OH naphthalen-7-yl | naphthalene-1,4-diyl-6-SO₃H | NHCH₂CH₂OH |
| 12 | 3-HO₃S, 5-OH naphthalen-7-yl | naphthalene-1,4-diyl-6-SO₃H | NH-(3-SO₃H-phenyl) |
| 13 | 3-HO₃S, 5-OH naphthalen-7-yl | naphthalene-1,4-diyl-6-SO₃H | NH-(3-COOH-phenyl) |
| 14 | 3-HO₃S, 5-OH naphthalen-7-yl | naphthalene-1,4-diyl-6-SO₃H | NH-(2-NH₂-5-... phenyl with SO₃H) |

TABLE 1-continued

A—N≡N—B—N≡N— (attached to) 1-hydroxy-3-sulfo-naphthalene with C substituent at 7-position

| Example No. | A- | -B- | C |
|---|---|---|---|
| 15 | 3-HO₃S, 1-OH naphthalen-7-yl | naphthalene-1,4-diyl with 6-SO₃H | 5-amino-2-(benzoylamino)-benzenesulfonic acid moiety (—NH—C₆H₃(SO₃H)—NH—CO—C₆H₅) |
| 16 | 3-HO₃S, 1-OH naphthalen-7-yl | naphthalene-1,4-diyl with 6-SO₃H | NHCOCH₃ |
| 17 | 3-HO₃S, 1-OH naphthalen-7-yl | naphthalene-1,4-diyl with 6-SO₃H | NH—CO—C₆H₅ |
| 18 | 3-HO₃S, 1-OH naphthalen-7-yl | naphthalene-1,4-diyl with 6-SO₃H | NH—C₆H₅ |
| 19 | 3-HO₃S, 1-OH naphthalen-7-yl | naphthalene-1,4-diyl with 6-SO₃H | NH—C₆H₄—SO₃H (para) |
| 20 | 3-HO₃S, 1-OH naphthalen-7-yl | naphthalene-1,4-diyl with 6-SO₃H | NH—C₆H₄—COOH (para) |

TABLE 1-continued
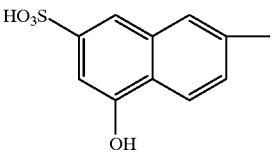
| Example No. | A- | -B- | C |
|---|---|---|---|
| 21 | 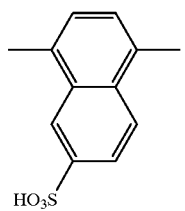 | 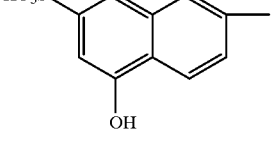 | NHCH$_2$CH$_2$NH$_2$ |
| 22 | 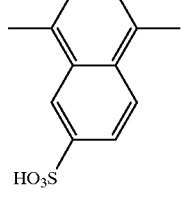 | 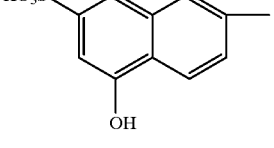 | NHCH$_2$CH$_2$CH$_2$N(CH$_3$)$_2$ |
| 23 | 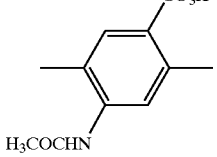 | 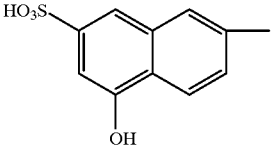 | NH$_2$ |
| 24 | 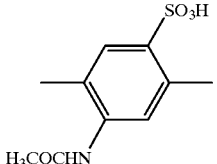 | 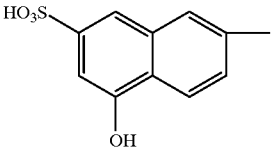 | 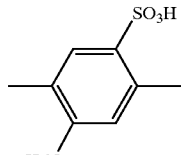 |
| 25 | 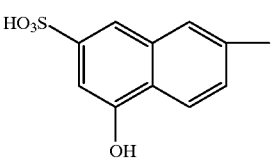 | 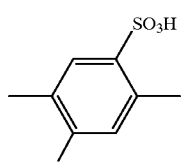 | NH$_2$ |
| 26 |  |  |  |

TABLE 1-continued
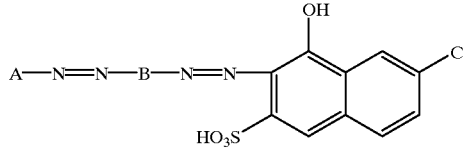
| Example No. | A- | -B- | C |
|---|---|---|---|
| 27 | 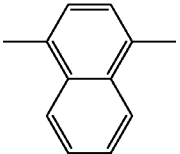 |  | NH$_2$ |
| 28 | 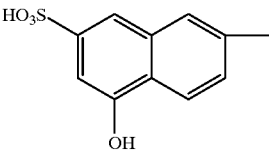 | 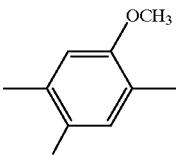 | NH$_2$ |
| 29 |  | 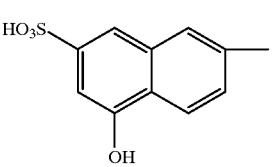 | 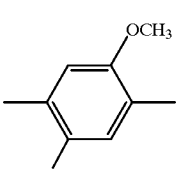 |
| 30 | 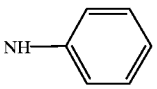 | 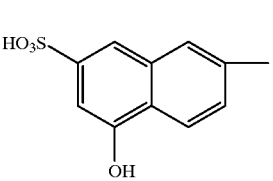 | NHCOCH$_3$ |
| 31 | 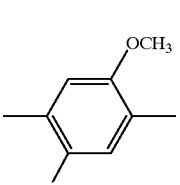 |  | NH$_2$ |
| 32 | 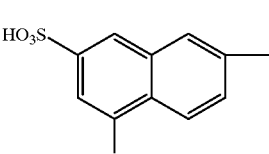 | 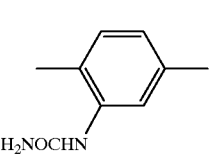 | NH$_2$ |
| 33 |  | 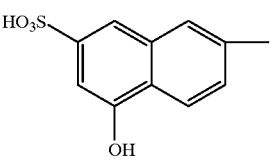 | NH$_2$ |

TABLE 1-continued
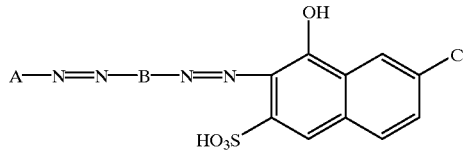
| Example No. | A- | -B- | C |
|---|---|---|---|
| 34 | 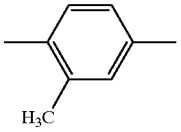 | 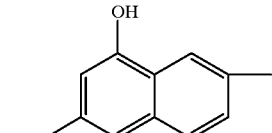 | NH$_2$ |
| 35 | 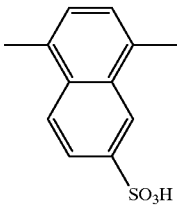 | 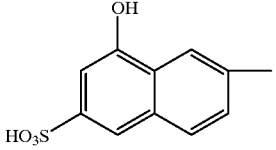 | NH$_2$ |
| 36 | 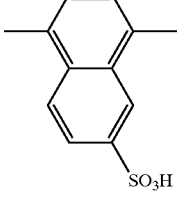 | 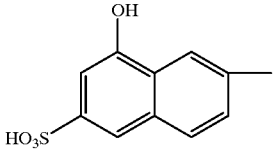 | NHCH$_2$CH$_2$NH$_2$ |
| 37 | 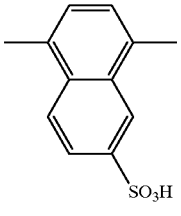 | 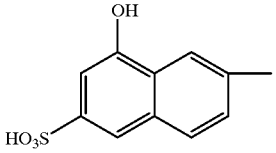 | 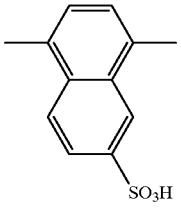 |
| 38 | 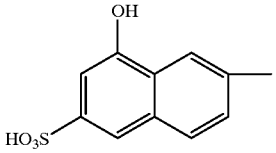 | 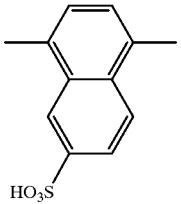 | NHCOCH$_3$ |
| 39 | | | NH$_2$ |

TABLE 1-continued
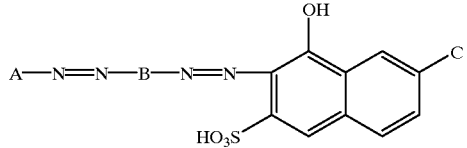
| Example No. | A- | -B- | C |
|---|---|---|---|
| 40 | 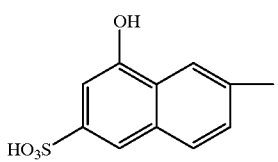 | 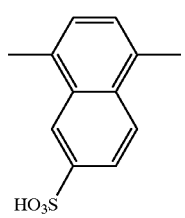 | NHCH$_2$CH$_2$NH$_2$ |
| 41 | 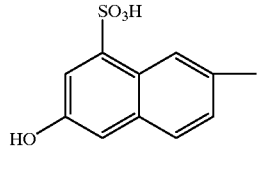 | 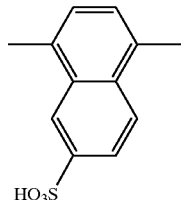 | NHCH$_2$CH$_2$OH |
| 42 | 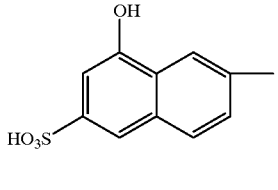 | 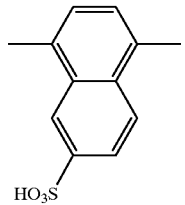 | NHCH$_2$CH$_2$CH$_2$N(CH$_3$)$_2$ |
| 43 | 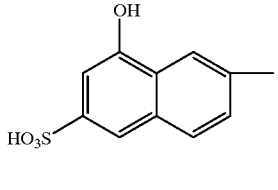 | 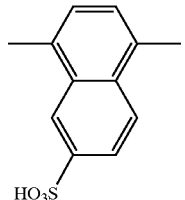 | 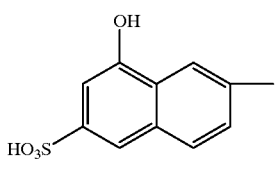 |
| 44 | 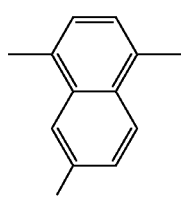 | 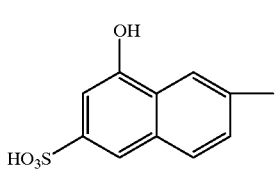 | NHCOCH$_3$ |
| 45 | 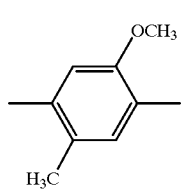 |  | NH$_2$ |

TABLE 1-continued
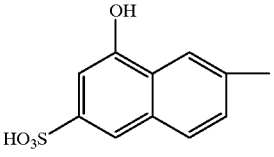
| Example No. | A- | -B- | C |
|---|---|---|---|
| 46 | 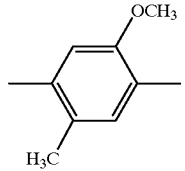 | 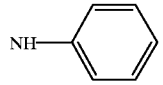 | 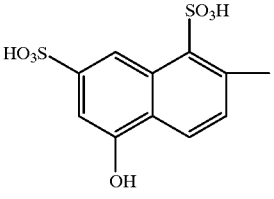 |
| 47 | 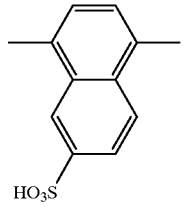 | 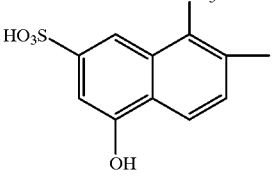 | NH$_2$ |
| 48 | 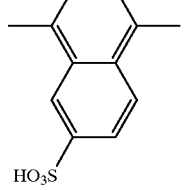 | 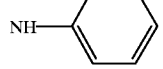 | 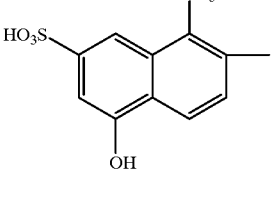 |
| 49 | 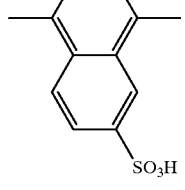 | 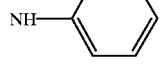 | 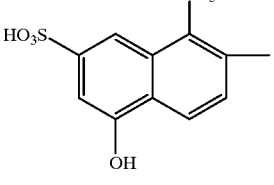 |
| 50 | 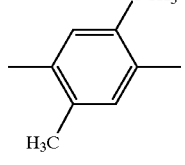 | 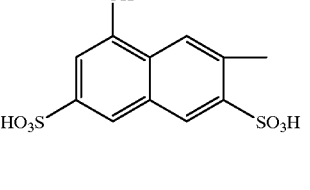 | NH$_2$ |
| 51 | 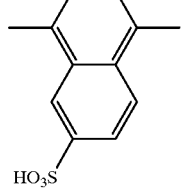 |  | NH$_2$ |

TABLE 1-continued
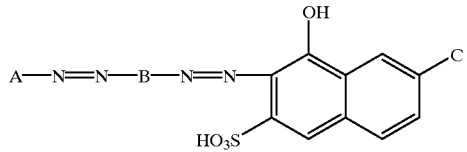
| Example No. | A- | -B- | C |
|---|---|---|---|
| 52 | 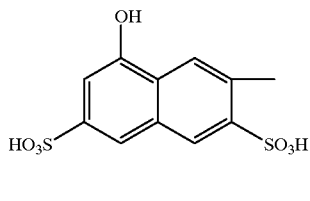 | 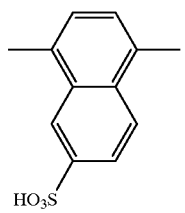 | 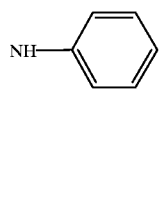 |
| 53 | 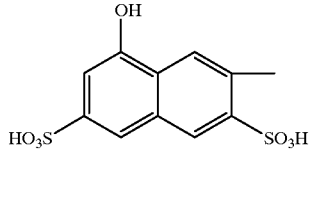 | 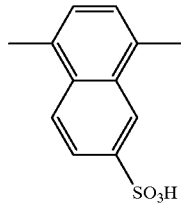 | 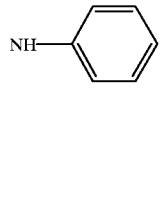 |
| 54 | 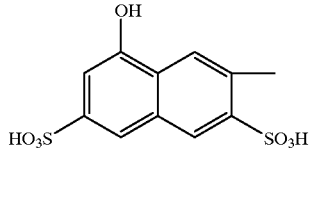 | 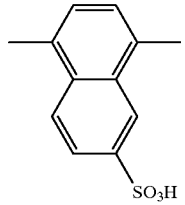 | NHCOCH$_3$ |
| 55 |  | 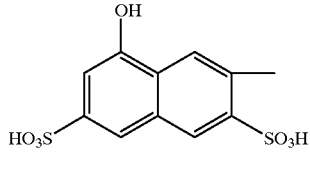 | NH$_2$ |
| 56 | 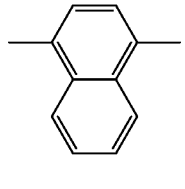 |  | NH$_2$ |
| 57 | 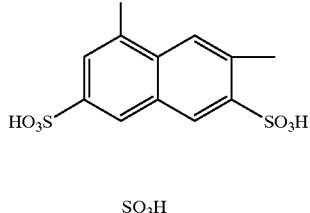 | 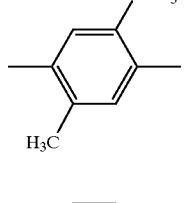 | NH$_2$ |

TABLE 1-continued

Structure: A—N=N—B—N=N—(naphthol with OH, HO₃S, and C substituent)

| Example No. | A- | -B- | C |
|---|---|---|---|
| 58 | 1-hydroxy-2-sulfo-naphthyl | naphthylene (with HO₃S) | NH₂ |
| 59 | 4-hydroxy-sulfo-naphthyl | naphthylene (with HO₃S) | NH₂ |
| 60 | hydroxy-sulfo-naphthyl | naphthylene (with HO₃S) | NH₂ |
| 61 | disulfo-hydroxy-naphthyl | naphthylene (with HO₃S) | NH₂ |

Example 62

When 26.6 g of 90.0% pure 2-amino-5-naphthol-7-sulfonic acid were coupled to 27.1 g of 82.4% pure 1-aminionaphthalene-6-sulfonic acid by the process of Example 1 and the diazonium derivative of the resulting monoazo dye was coupled to 26.6 g of 90% pure 2-amino-5-naphthol-7-sulfonic acid in the presence of sodium bicarbonate at pH 6.5–7.5, the disazo dye of the formula

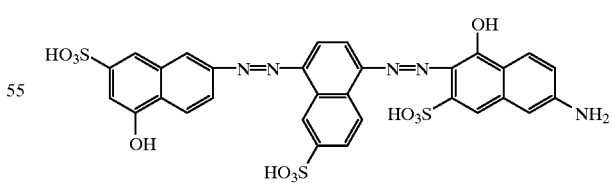

($\lambda_{max}$ 545 nm) was obtained. In the dried state, the dye was a black powder that dyes paper and cotton in violet shades.

Examples 63 to 94
The dyes shown in the following tables, which dye paper and cotton in violet to violet-tinged black shades, can be prepared in a similar manner.
TABLE 2
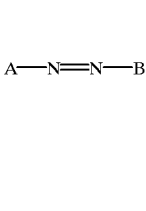
| Example No. | A— | —B— | C |
|---|---|---|---|
| 63 | 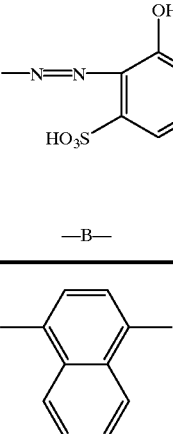 | 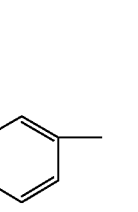 | NH$_2$ |
| 64 | 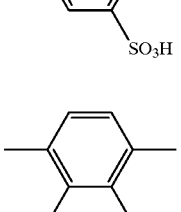 | 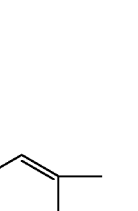 | NHCH$_2$CH$_2$NH$_2$ |
| 65 | 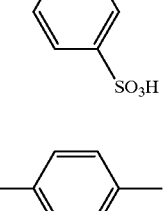 |  | NHCH$_2$CH$_2$CH$_2$N(CH$_3$)$_2$ |
| 66 | 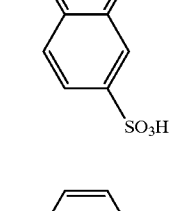 | 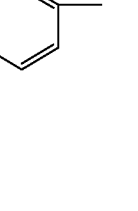 | 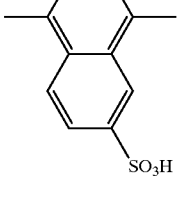 |
| 67 | | | |

TABLE 2-continued

Structure: A—N=N—B—N=N—(1-hydroxy-3-sulfo-6-C-naphthalen-2-yl)

| Example No. | A— | —B— | C |
|---|---|---|---|
| 68 | 7-HO₃S-4-OH-naphthalen-2-yl | 4,8-disubstituted-6-sulfo-naphthalene-1,5-diyl | 2-amino-5-amino-benzenesulfonic acid (—NH-C₆H₃(SO₃H)-NH₂) |
| 69 | 7-HO₃S-4-OH-naphthalen-2-yl | 4,8-disubstituted-6-sulfo-naphthalene-1,5-diyl | NHCOCH₃ |
| 70 | 7-HO₃S-4-OH-naphthalen-2-yl | 4,8-disubstituted-6-sulfo-naphthalene-1,5-diyl | NH—CO—NH₂ |
| 71 | 7-HO₃S-4-OH-naphthalen-2-yl | 4,8-disubstituted-6-sulfo-naphthalene-1,5-diyl | NH—C₆H₅ |
| 72 | 7-HO₃S-4-OH-naphthalen-2-yl | 4,8-disubstituted-6-sulfo-naphthalene-1,5-diyl | 3-carboxy-anilino (—NH-C₆H₄-COOH) |
| 73 | 7-HO₃S-4-OH-naphthalen-2-yl | 4,8-disubstituted-6-sulfo-naphthalene-1,5-diyl | 4-amino-2-sulfo-(N-benzoyl)anilino |

TABLE 2-continued
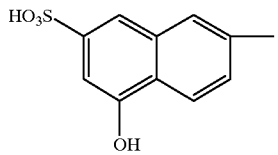
| Example No. | A— | —B— | C |
|---|---|---|---|
| 74 | 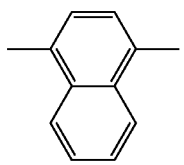 | 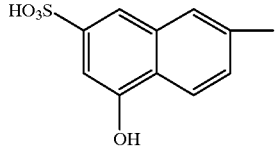 | NH$_2$ |
| 75 | 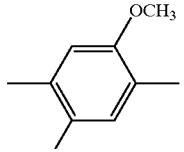 | 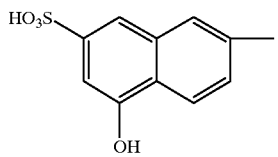 | NH$_2$ |
| 76 | 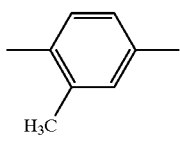 | 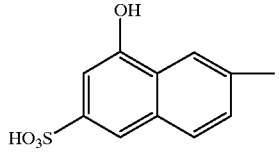 | NH$_2$ |
| 77 | 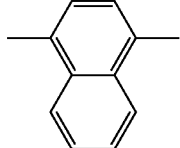 | 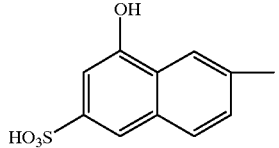 | NH$_2$ |
| 78 | 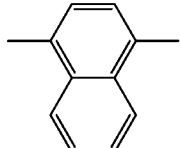 | 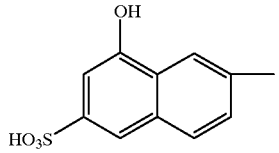 | 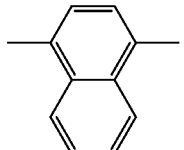 |
| 79 | | | |

TABLE 2-continued
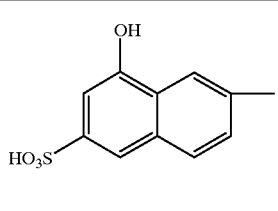
| Example No. | A— | —B— | C |
|---|---|---|---|
| 80 | 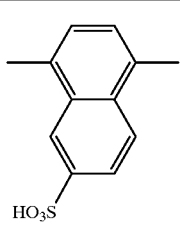 | 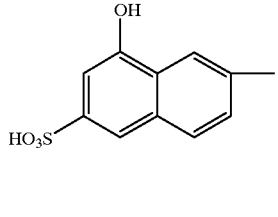 | NH$_2$ |
| 81 | 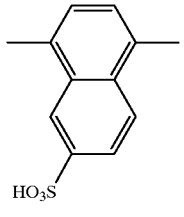 | 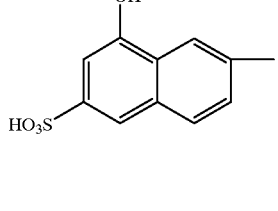 | 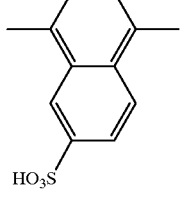 |
| 82 | 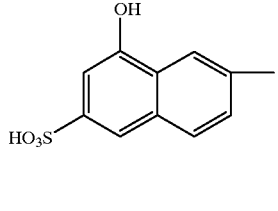 | 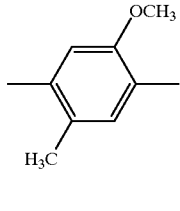 | 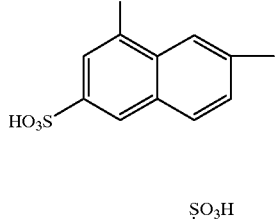 |
| 83 | 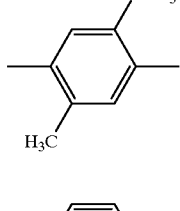 | 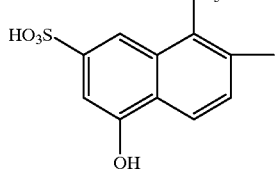 | NH$_2$ |
| 84 | 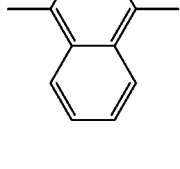 | |  |
| 85 | | | NH$_2$ |

TABLE 2-continued
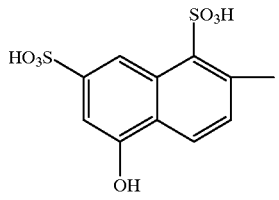
| Example No. | A— | —B— | C |
|---|---|---|---|
| 86 | 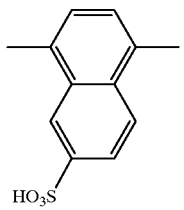 | 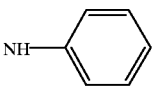 | 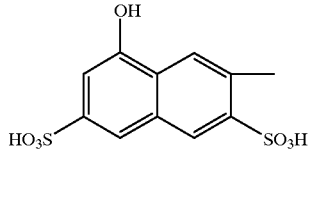 |
| 87 | 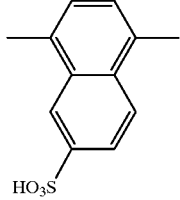 | 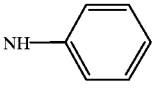 | 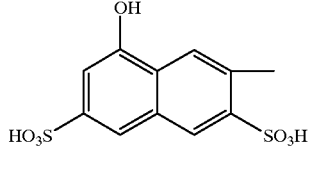 |
| 88 | 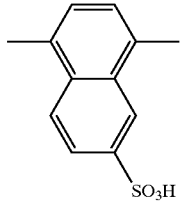 | 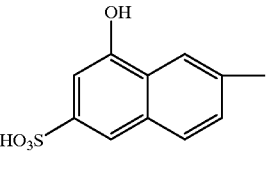 | NH$_2$ |
TABLE 3
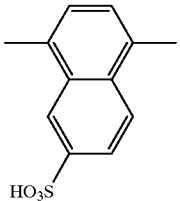
| Example No. | A— | —B— | C |
|---|---|---|---|
| 89 | (structure shown) | (structure shown) | NH$_2$ |

TABLE 3-continued

Structure:

A—N=N—B—N=N— [naphthalene with OH, HO₃S, SO₃H, and C substituents]

| Example No. | A— | —B— | C |
|---|---|---|---|
| 90 | naphthalene with OH and HO₃S | naphthalene with SO₃H | NHCOCH₃ |
| 91 | naphthalene with OH and HO₃S | benzene with OCH₃ and H₃C | NH₂ |
| 92 | naphthalene with HO₃S and OH | naphthalene with HO₃S | NH₂ |
| 93 | naphthalene with HO₃S and OH | naphthalene with HO₃S | NH—CO—phenyl |
| 94 | naphthalene with HO₃S and OH | benzene with OCH₃ and H₃C | NH₂ |

Dyeing Example 1

10 g of cotton yarn were introduced at 40° C. into a bath of 250 ml of water, 0.2 g of sodium carbonate, 4 g of sodium sulfate, and 0.15 g of the dye prepared according to Example 1. The temperature of the dye liquor was increased to 95° C. with constant agitation of the yarn and the dyeing was carried out at this temperature for 45 minutes until the residual liquor was only weakly colored. The dyed yarn was then wrung out, rinsed with cold water, and dried at 60° C. The yarn was dyed deep black and was distinguished by a good fastness to washing and perspiration.

Dyeing Example 2

800 kg of bleached sulfate cellulose and 200 kg of bleached sulfite cellulose were pulped in a pulper with 14 cbm of production water for 30 minutes until free from specks. The pulp was then transferred to a draining vat, beaten to a freeness of 25° SR (Schopper-Riegler) with a hollander, and finally introduced into a mixing vat into which were added 250 kg of kaolin 1a, 1% of the dye of Example 2 as an aqueous solution of 20 g/l and, after an absorption time of 15 minutes, additionally 2% of rosin size and 10 minutes later 4% of alum. The percent content of dye, rosin size, and alum was in each case based on the absolutely dry fiber. The pH of the mixture is 5.3. The cellulose suspension was then processed to paper on a papermaking machine by a process customary in the industry. A printing paper that was dyed an intense black and has good resistance to sodium carbonate solution, acetic acid, water, and alcohol was obtained. The wastewater was practically colorless.

Dyeing Example 3

1000 kg of bleached sulfate cellulose were pulped and beaten as described under Dyeing Example 2. The addition of 1% of a fixing agent and 1% of dye of Example 2 in the form of an aqueous solution of 20 g/l took place in the mixing vat. After an absorption time of 15 minutes, the cellulose was processed to paper. A tissue which was dyed black and has very good fastnesses to sodium carbonate solution, acetic acid, water, and alcohol was obtained.

What is claimed is:

1. A method for dyeing and printing materials containing carboxamide groups and/or cellulosic materials comprising applying to said materials a dye having the formula

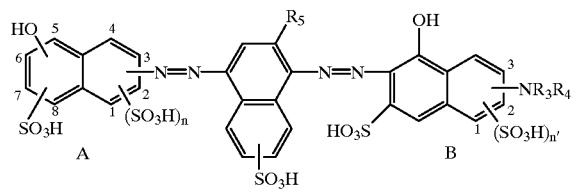

wherein $R_3$ represents hydrogen; unsubstituted $C_1$–$C_4$-alkyl or $C_1$–$C_4$-alkyl substituted by $NH_2$, di($C_1$–$C_4$-alkyl) amino, OH, or $C_1$–$C_4$-alkoxy; unsubstituted aryl or aryl substituted one to four times in an identical or different manner by $C_1$–$C_4$-alkyl, $C_1$–$C_4$-alkoxy, $NH_2$, OH, sulfo, or carboxyl; ureido; formyl; $C_1$–$C_4$-alkylcarbonyl; or unsubstituted benzoyl or benzoyl substituted one to four times in an identical or different manner by $C_1$–$C_4$-alkyl, $C_1$–$C_4$-alkoxy, sulfo, or carboxyl;

$R_4$ represents hydrogen, unsubstituted $C_1$–$C_4$-alkyl, or $C_1$–$C_4$-alkyl substituted by hydroxyl or $C_1$–$C_4$-alkoxy;

$R_5$ represents hydrogen, $C_1$–$C_4$-alkyl, or $C_1$–$C_4$-alkoxy; and n and n' independently of one another represent the number 0 or 1, with the provisos that
(i) in naphthyl ring A the OH group is in the 5-, 6-, or 8-position, the $SO_3H$ group is in the 6-, 7-, or 8-position, the $(SO_3H)_n$ group is in the 1-, 3-, or 4-position, and the azo group is in the 1- or 2-position, and
(ii) in naphthyl ring B the $NR_3R_4$ group is in the 2- or 3-position and the $(SO_3H)_{n'}$ group is in the 1- or 2-position.

2. A method for dyeing paper in the pulp or on the surface comprising applying to said pulp a dye having the formula

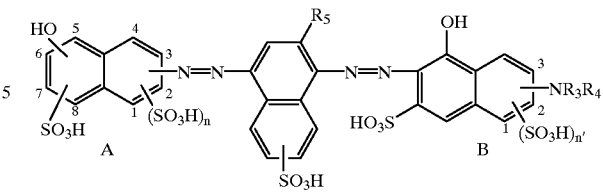

wherein $R_3$ represents hydrogen; unsubstituted $C_1$–$C_4$-alkyl or $C_1$–$C_4$-alkyl substituted by $NH_2$, di($C_1$–$C_4$-alkyl) amino, OH, or $C_1$–$C_4$-alkoxy; unsubstituted aryl or aryl substituted one to four times in an identical or different manner by $C_1$–$C_4$-alkyl, $C_1$–$C_4$-alkoxy, $NH_2$, OH, sulfo, or carboxyl; ureido; formyl; $C_1$–$C_4$-alkylcarbonyl; or unsubstituted benzoyl or benzoyl substituted one to four times in an identical or different manner by $C_1$–$C_4$-alkyl, $C_1$–$C_4$-alkoxy, sulfo, or carboxyl;

$R_4$ represents hydrogen, unsubstituted $C_1$–$C_4$-alkyl, or $C_1$–$C_4$-alkyl substituted by hydroxyl or $C_1$–$C_4$-alkoxy;

$R_5$ represents hydrogen, $C_1$–$C_4$-alkyl, or $C_1$–$C_4$-alkoxy; and n and n' independently of one another represent the number 0 or 1, with the provisos that
(i) in naphthyl ring A the OH group is in the 5-, 6-, or 8-position, the $SO_3H$ group is in the 6-, 7-, or 8-position, the $(SO_3H)_n$ group is in the 1-, 3-, or 4-position, and the azo group is in the 1- or 2-position, and
(ii) in naphthyl ring B the $NR_3R_4$ group is in the 2- or 3-position and the $(SO_3H)_{n'}$ group is in the 1- or 2-position.

3. A method according to claim 1 for printing paper with an ink jet recording apparatus.

4. A dye having the formula

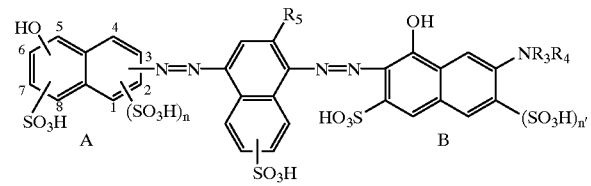

wherein $R_3$ represents hydrogen; unsubstituted $C_1$–$C_4$-alkyl or $C_1$–$C_4$-alkyl substituted by $NH_2$, di($C_1$–$C_4$-alkyl) amino, OH, or $C_1$–$C_4$-alkoxy; unsubstituted aryl or aryl substituted one to four times in an identical or different manner by $C_1$–$C_4$-alkyl, $C_1$–$C_4$-alkoxy, $NH_2$, OH, sulfo, or carboxyl; ureido; formyl; $C_1$–$C_4$-alkylcarbonyl; or unsubstituted benzoyl or benzoyl substituted one to four times in an identical or different manner by $C_1$–$C_4$-alkyl, $C_1$–$C_4$-alkoxy, sulfo, or carboxyl;

$R_4$ represents hydrogen, unsubstituted $C_1$–$C_4$-alkyl, or $C_1$–$C_4$-alkyl substituted by hydroxyl or $C_1$–$C_4$-alkoxy;

$R_5$ represents hydrogen, $C_1$–$C_4$-alkyl, or $C_1$–$C_4$-alkoxy; and n and n' independently of one another represent the number 0 or 1, with the proviso that in naphthyl ring A the OH group is in the 5-, 6-, or 8-position, the $SO_3H$ group is in the 6-,

43

7-, or 8-position, the $(SO_3H)_n$ group is in the 1-, 3-, or 4-position, and the azo group is in the 1- or 2-position.

5. A process for the preparation of a dye having the formula

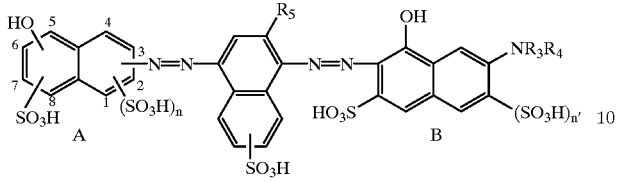

wherein
- $R_3$ represents hydrogen; unsubstituted $C_1$–$C_4$-alkyl or $C_1$–$C_4$-alkyl substituted by $NH_2$, di($C_1$–$C_4$-alkyl)amino, OH, or $C_1$–$C_4$-alkoxy; unsubstituted aryl or aryl substituted one to four times in an identical or different manner by $C_1$–$C_4$-alkyl, $C_1$–$C_4$-alkoxy, $NH_2$, OH, sulfo, or carboxyl; ureido; formyl; $C_1$–$C_4$-alkylcarbonyl; or unsubstituted benzoyl or benzoyl substituted one to four times in an identical or different manner by $C_1$–$C_4$-alkyl, $C_1$–$C_4$-alkoxy, sulfo, or carboxyl;
- $R_4$ represents hydrogen, unsubstituted $C_1$–$C_4$-alkyl, or $C_1$–$C_4$-alkyl substituted by hydroxyl or $C_1$–$C_4$-alkoxy;
- $R_5$ represents hydrogen, $C_1$–$C_4$-alkyl, or $C_1$–$C_4$-alkoxy; and
- n and n' independently of one another represent the number 0 or 1, with the proviso that in naphthyl ring A the OH group is in the 5-, 6-, or 8-position, the $SO_3H$ group is in the 6-, 7-, or 8-position, the $(SO_3H)_n$ group is in the 1-, 3-, or 4-position, and the azo group is in the 1- or 2-position, comprising (a) diazotizing an aminonaphtholsulfonic acid of the formula

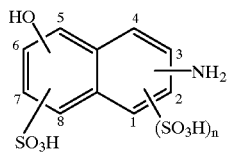

with the proviso that the OH group is in position 5, 6, or 8, the $SO_3H$ group is in position 6, 7, or 8, the $(SO_3H)_n$ group is in position 1, 3, or 4, the amino group is in position 1 or 2, and n denotes the number 0 or 1, to form a diazotization product;

(b) coupling the diazotization product from step (a) with an aminonaphthalene of the formula

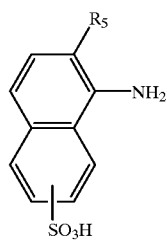

wherein $R_5$ has the meanings stated above, to form an aminoazo dye having the formula

44

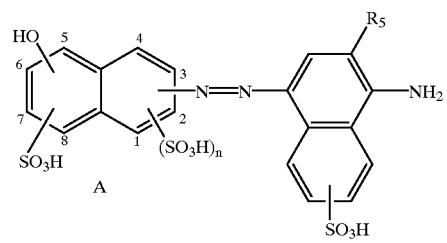

wherein $R_5$ and n have the meanings stated above and the bonding of the substituents in naphthyl ring A is as stated above;

(c) diazotizing the aminoazo dye from step (b) to form a second diazotization product;

(d) coupling the diazotization product from step (c) with an aminonaphtholsulfonic acid of the formula

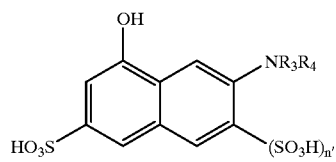

wherein $R_3$, $R_4$, and n' have the meanings stated above.

6. A method for dyeing and printing materials containing carboxamide groups and/or cellulosic materials comprising applying to said materials a dye having the formula

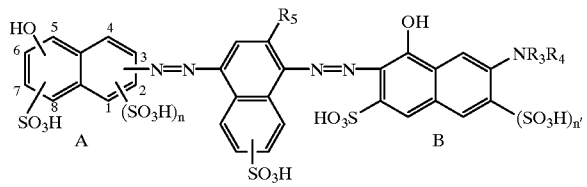

wherein
- $R_3$ represents hydrogen; unsubstituted $C_1$–$C_4$-alkyl or $C_1$–$C_4$-alkyl substituted by $NH_2$, di($C_1$–$C_4$-alkyl)amino, OH, or $C_1$–$C_4$-alkoxy; unsubstituted aryl or aryl substituted one to four times in an identical or different manner by $C_1$–$C_4$-alkyl, $C_1$–$C_4$-alkoxy, $NH_2$, OH, sulfo, or carboxyl; ureido; formyl; $C_1$–$C_4$-alkylcarbonyl; or unsubstituted benzoyl or benzoyl substituted one to four times in an identical or different manner by $C_1$–$C_4$-alkyl, $C_1$–$C_4$-alkoxy, sulfo, or carboxyl;
- $R_4$ represents hydrogen, unsubstituted $C_1$–$C_4$-alkyl, or $C_1$–$C_4$-alkyl substituted by hydroxyl or $C_1$–$C_4$-alkoxy;
- $R_5$ represents hydrogen, $C_1$–$C_4$-alkyl, or $C_1$–$C_4$-alkoxy; and
- n and n' independently of one another represent the number 0 or 1, with the proviso that in naphthyl ring A the OH group is in the 5-, 6-, or 8-position, the $SO_3H$ group is in the 6-, 7-, or 8-position, the $(SO_3H)_n$ group is in the 1-, 3-, or 4-position, and the azo group is in the 1- or 2-position.

7. A method for dyeing paper in the pulp or on the surface comprising applying to said pulp a dye having the formula

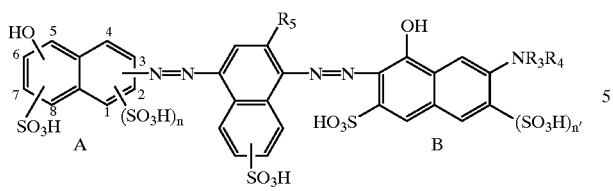

wherein $R_3$ represents hydrogen; unsubstituted $C_1$–$C_4$-alkyl or $C_1$–$C_4$-alkyl substituted by $NH_2$, di($C_1$–$C_4$-alkyl)amino, OH, or $C_1$–$C_4$-alkoxy; unsubstituted aryl or aryl substituted one to four times in an identical or different manner by $C_1$–$C_4$-alkyl, $C_1$–$C_4$-alkoxy, $NH_2$, OH, sulfo, or carboxyl; ureido; formyl; $C_1$–$C_4$-alkylcarbonyl; or unsubstituted benzoyl or benzoyl substituted one to four times in an identical or different manner by $C_1$–$C_4$-alkyl, $C_1$–$C_4$-alkoxy, sulfo, or carboxyl;

$R_4$ represents hydrogen, unsubstituted $C_1$–$C_4$-alkyl, or $C_1C_4$-alkyl substituted by hydroxyl or $C_1$–$C_4$-alkoxy;

$R_5$ represents hydrogen, $C_1$–$C_4$-alkyl, or $C_1$–$C_4$-alkoxy; and n and n' independently of one another represent the number 0 or 1, with the proviso that in naphthyl ring A the OH group is in the 5-, 6-, or 8-position, the $SO_3H$ group is in the 6-, 7-, or 8-position, the $(SO_3H)_n$ group is in the 1-, 3-, or 4-position, and the azo group is in the 1- or 2-position.

8. A method according to claim 6 for printing paper with an ink jet recording apparatus.

9. An aqueous dye preparation comprising (a) a dye having the formula

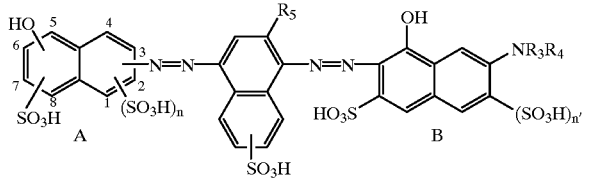

wherein $R_3$ represents hydrogen; unsubstituted $C_1$–$C_4$-alkyl or $C_1$–$C_4$-alkyl substituted by $NH_2$, di($C_1$–$C_4$-alkyl)amino, OH, or $C_1$–$C_4$-alkoxy; unsubstituted aryl or aryl substituted one to four times in an identical or different manner by $C_1$–$C_4$-alkyl, $C_1$–$C_4$-alkoxy, $NH_2$, OH, sulfo, or carboxyl; ureido; formyl; $C_1$–$C_4$-alkylcarbonyl; or unsubstituted benzoyl or benzoyl substituted one to four times in an identical or different manner by $C_1$–$C_4$-alkyl, $C_1$–$C_4$-alkoxy, sulfo, or carboxyl;

$R_4$ represents hydrogen, unsubstituted $C_1$–$C_4$-alkyl, or $C_1$–$C_4$-alkyl substituted by hydroxyl or $C_1$–$C_4$-alkoxy;

$R_5$ represents hydrogen, $C_1$–$C_4$-alkyl, or $C_1$–$C_4$-alkoxy; and n and n' independently of one another represent the number 0 or 1, with the proviso that in naphthyl ring A the OH group is in the 5-, 6-, or 8-position, the $SO_3H$ group is in the 6-, 7-, or 8-position, the $(SO_3H)_n$ group is in the 1-, 3-, or 4-position, and the azo group is in the 1- or 2-position; and (b) water.

10. An aqueous dye preparation according to claim 9 comprising (a) 0.5 to 20% by weight of the dye, (b) 0 to 5% by weight of at least one dye for shading, (c) 50 to 99.5% by weight of water, (d) 0 to 30% by weight of one or more water-soluble organic solvents and/or agents having a hydrotropic action, and (e) 0 to 30% by weight of one or more additives.

11. A method for ink jet printing comprising applying an aqueous dye preparation according to claim 9 to a substrate with an ink jet recording apparatus.

* * * * *